Dec. 6, 1927.
W. PATERSON ET AL
1,652,133
AUTOMOBILE AND TRUCK TRACTION ATTACHMENT
Filed Oct. 4, 1926
2 Sheets-Sheet 1
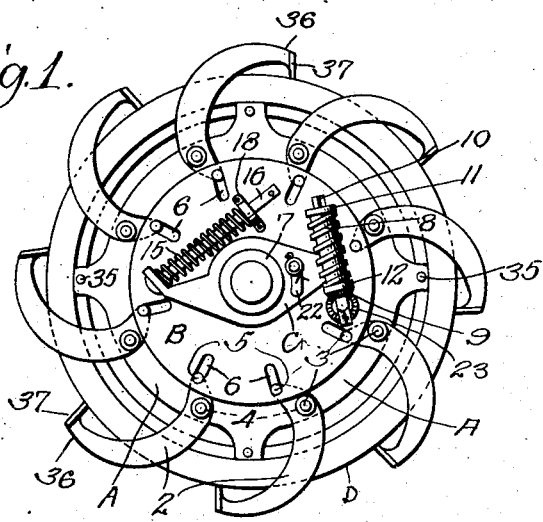
Fig. 1.
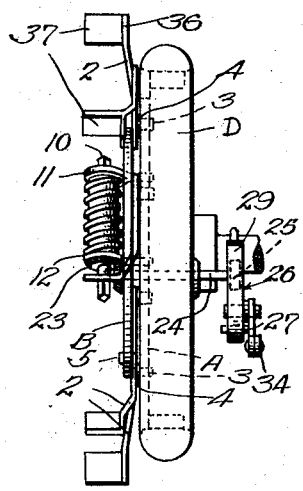
Fig. 8.
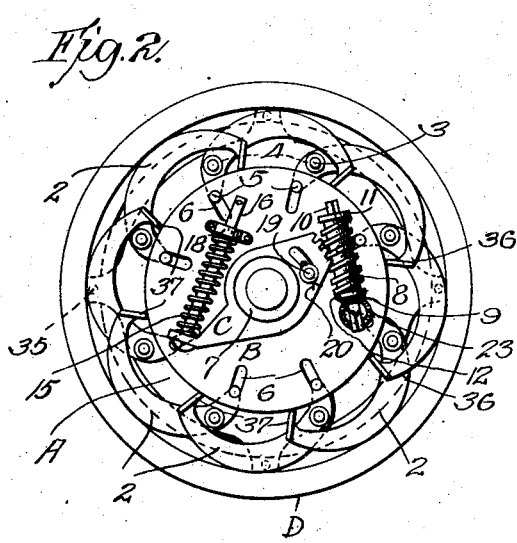
Fig. 2.    Fig. 10.    Fig. 11.
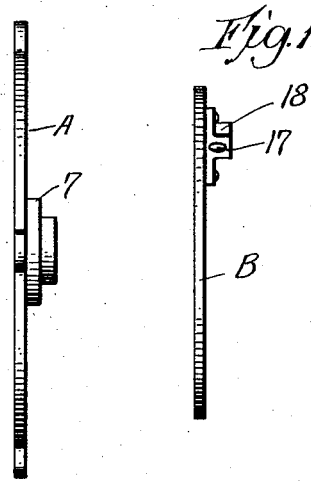
Inventors
William Paterson
May H. Paterson Dec. 6, 1927.                                                    1,652,133
              W. PATERSON ET AL
        AUTOMOBILE AND TRUCK TRACTION ATTACHMENT
              Filed Oct. 4, 1926        2 Sheets-Sheet 2
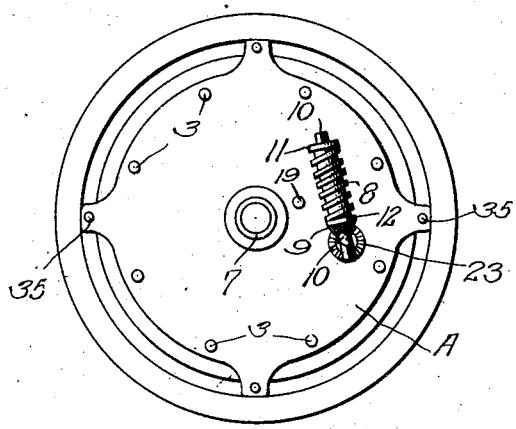
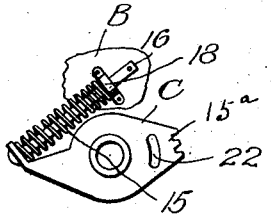
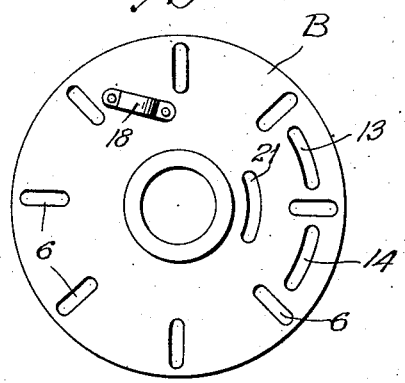
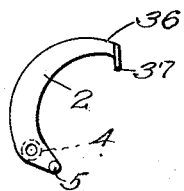
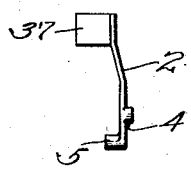
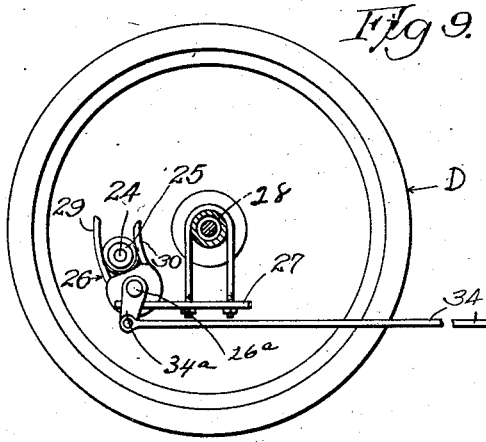
Inventors
William Paterson
May H. Paterson Patented Dec. 6, 1927.

1,652,133

UNITED STATES PATENT OFFICE.

WILLIAM PATERSON AND MAY H. PATERSON, OF OAKLAND, CALIFORNIA.

AUTOMOBILE AND TRUCK TRACTION ATTACHMENT.

Application filed October 4, 1926. Serial No. 139,516.

Our invention relates to improvements in automobile and truck traction and anti-skid attachment of which the following is a specification.

The object of our invention is to provide a combination anti-skid and traction device to enable an automobile or truck to travel anywhere over sand, mud, clay, snow or ice, by reason of the resilient paddles having thin sled-like arms and transverse lugs that can be instantly pressed to the ground. The car cannot skid on any surface. A further object is to furnish a device that can be readily attached to and detached from the drive wheels of an automobile or truck.

The invention consists of a disk having a hub adapted to receive the hub of the drive wheel of automobile or truck hub, said disk being fixed at its periphery to the rim or felly of the drive wheel of an automobile or truck. A supplemental disk is turnably mounted upon an auxiliary hub formed upon said fixed disk; paddles are designed to project beyond the face of said drive wheel and capable of being withdrawn simultaneously toward the hub, said paddles being pivotally mounted near their centers upon studs fixed to said fixed disk and mechanism for actuating said paddles from the driver's seat, while the vehicle is in motion or by means of a socket wrench while at a stand still from the ground. Said paddles being furnished with thin circular elongated arms capable of resilient contact with a slippery surface, form an anti-skid device.

It further consists in certain details of construction, all of which will be more fully explained by referring to the accompanying drawings, in which—

Fig. 1 is a side elevation of a vehicle wheel and our invention secured thereto, the paddles being shown projected.

Fig. 2 is a side elevation of the same showing the paddles drawn in toward the hub.

Fig. 3 is a side elevation of the disk fixed to the felly of the drive wheel, showing the worm and bevel pinion attached.

Fig. 4 is a side elevation of the supplemental disk having slotted holes, in which knobs fixed to one end of the paddles slide.

Fig. 5 is an elevation of a gear plate comprising a segment of a pinion and a spiral spring attached thereto.

Fig. 6 is a side view of a paddle.

Fig. 7 is an edge view of a paddle.

Fig. 8 is a rear view of a drive wheel with our invention attached thereto.

Fig. 9 is a side view of a tilting mechanism having a gab with upper and lower rails or racks attached, pivoted upon a standard fixed to the housing of the drive wheel axle.

Fig. 10 is an edge view of said fixed disk having the auxiliary hub attached.

Fig. 11 is an edge view of the turnable disk having the perforated block attached.

In the drawings, A represents the fixed disk, attached to the rim or felly of the drive wheel D. B is the turnable disk and C the gear plate. The paddles 2 are pivotally mounted upon studs 3, which are fixed to disk A, disk A being fixed to the drive wheel rim at 35. The paddles 2 having bearings 4, oscillate upon studs 3, the paddles 2 having knobs 5 adapted to slide within the slotted holes 6 provided in the disk B. The disk B is turnably mounted upon the auxiliary hub 7, and gear plate C having the spiral spring 15 and segment of a pinion 15$^a$ is also mounted upon said auxiliary hub 7. The worm gear 8 having the bevel pinion 9 mounted upon the worm shaft 10, is journalled within journal boxes 11 and 12, said journal boxes being fixed to disk A. Elongated holes 13 and 14 formed in disk B, permit disk B to oscillate between said journal boxes. The spiral spring 15 surrounds the rod 16 which is loosely attached to gear plate C at one end of said rod 16, the other end of rod 16 being adapted to enter the perforation 17, in the block 18, fixed upon the disk B. A stud 19, having a cotter pin 20, is fixed to disk A and projects through the slotted hole 21 in disk B. The stud 19 also projects through the slotted hole 22 in the gear plate C, and the cotter pin 20 that passes through stud 19 secures the gear plate C, and disk B loosely to disk A. The bevel pinion 9 mounted upon the screw pinion shaft 10 meshes with the bevel pinion 23, the bevel pinion 23 being fixed to shaft 24 at one of its ends, and a friction wheel 25 being mounted upon its other end. Said bevel pinion 23 being in gear with the bevel pinion 9, transmits motion from the friction wheel 25 to the worm gear 8. A tilting gab 26 is pivotally mounted upon a standard 27, said standard being clamped to axle housing of the drive wheel at 28. The tilting gab 26 having the curved rails or racks 29 and 30 on either side of the friction wheel 25, is capable of being raised and lowered through the medium of the lever 31, the extension rod 34 crank 34ª upon shaft 26 and pawl 32 and sector 33 situated near the driver's seat. When the upper rail 29 is lowered into contact with the periphery of the friction wheel 25, the latter will revolve and project the paddles outwardly, and when the under rail 30 is brought in contact with the friction wheel 25, the latter will reverse and draw the paddles in toward the hub. The shaft 10 of the worm gear 8, is square at one of its ends to receive a socket wrench and can be turned in either direction by said socket wrench. Hence the paddles can be projected and retracted and held at any desired position independent of the friction wheel mechanism. The spiral spring 15 being pressed against block 18 by the action of the worm on gear plate C, thus projects the paddles to their full extent. In turning the gear plate C in the opposite direction, the rod 16 that passes through the block 18, will press the paddles toward the hub.

The curved arms 36 and the lugs 37 of the paddles 2 are adapted to engage the ground and thus afford increased traction and prevents skidding when the paddles 2 are projected.

Suitable transmission such as flexible or universal joint shafting may be substituted for the bevel gear transmission, but we prefer the bevel gear as shown.

Having thus described our invention what we claim is:

1. A combined traction and anti-skid attachment for a vehicle drive wheel comprising a disk having a hub adapted to receive the hub of the drive wheel of an automobile or truck, said disk being fixed at its periphery to the felly of said drive wheel, a supplemental disk rotatably mounted upon an auxiliary hub formed upon said fixed disk and having slots, paddles pivotally mounted upon studs fixed to said fixed disk, said paddles having sled like curved arms adapted to come in resilient contact with the ground, and having transverse lugs at their outer ends, knobs fixed at their inner ends, said knobs being designed to slide in said slots and means for rotating said supplemental disk.

2. A combined traction and anti-skid attachment for a vehicle drive wheel comprising a disk adapted to be fixed at its outer periphery to the felly of said drive wheel, said disk having a hub adapted to receive the hub of said drive wheel, a rotatable disk mounted upon the hub of said fixed disk and having slots, paddles pivotally mounted upon studs fixed to said fixed disk, knobs fixed to the inner ends of said paddles designed to slide within the slots in the rotatable disk, a gear plate rotatably mounted upon the hub of said fixed disk, said gear plate having at one end a loosely attached rod surrounded by a spiral spring and a segment of a screw pinion at its other end, a block on the rotatable disk having a perforation adapted to receive one end of said rod, said spring being interposed between said block and one end of said gear plate to maintain a resilient pressure upon said block, and a worm gear to actuate said gear plate, the paddles being projected when the worm gear is rotated in one direction and retracted when the worm is rotated in the reverse direction, said worm gear or screw shaft being journalled in two boxes mounted upon two studs fixed upon said fixed disk, said shaft of said screw which projects through said journal boxes being provided with square ends to receive a socket wrench upon either end.

3. A combined traction and anti-skid attachment for a vehicle drive wheel comprising a disk adapted to be fixed at its outer periphery to the felly of said drive wheel, said disk having a hub adapted to receive the hub of said drive wheel, a supplemental disk rotatably mounted upon the hub of said fixed disk, and having slots, paddles pivotally mounted upon studs fixed to said fixed disk, knobs fixed to the inner ends of said paddles designed to slide within the slots in the rotatable disk, a gear plate rotatably mounted on the hub of said fixed disk, said gear plate having at one end a loosely attached rod surrounded by a spiral spring and a segment of a screw pinion at its other end, a block on the rotatable disk having a perforation adapted to receive one end of said rod, said spring being interposed between said block and one end of said gear plate to maintain a resilient pressure upon said block, and a worm gear to actuate said gear plate, the paddles being projected when the worm gear is rotated in one direction and retracted when the worm gear is rotated in the reverse direction, a bevel pinion mounted upon one end of said screw pinion shaft, a corresponding bevel pinion mounted upon one end of a horizontal shaft which is journalled in housing fixed upon said disk, a friction wheel mounted upon the other end of said horizontal shaft, said friction wheel being adapted to pass between an upper and lower curved rail attached to a tilting gab mounted upon bearings fixed to the housing of the drive wheel axle, a reversing lever to raise or lower the said tilting gab through the medium of a connecting rod extending from said lever to a crank fixed to the tilting gear shaft.

WILLIAM PATERSON.
MAY H. PATERSON.